US012444308B2

(12) United States Patent
Choi et al.

(10) Patent No.: US 12,444,308 B2
(45) Date of Patent: Oct. 14, 2025

(54) 4-DIMENSIONAL PATH DISPLAY METHOD FOR UNMANNED VEHICLE USING POINT CLOUD

(71) Applicant: CLROBUR CO., LTD, Incheon (KR)

(72) Inventors: Tae In Choi, Incheon (KR); Seong Won Jo, Incheon (KR)

(73) Assignee: CLROBUR CO., LTD, Incheon (KR)

( * ) Notice: Subject to any disclaimer, the term of this patent is extended or adjusted under 35 U.S.C. 154(b) by 201 days.

(21) Appl. No.: 17/802,217

(22) PCT Filed: Jun. 1, 2021

(86) PCT No.: PCT/KR2021/006813
§ 371 (c)(1),
(2) Date: Aug. 25, 2022

(87) PCT Pub. No.: WO2022/211182
PCT Pub. Date: Oct. 6, 2022

(65) Prior Publication Data
US 2023/0282116 A1 Sep. 7, 2023

(30) Foreign Application Priority Data
Mar. 31, 2021 (KR) ........................ 10-2021-0041973
May 18, 2021 (KR) ........................ 10-2021-0063756

(51) Int. Cl.
*G08G 5/22* (2025.01)
*G08G 5/34* (2025.01)
(Continued)

(52) U.S. Cl.
CPC ................ *G08G 5/22* (2025.01); *G08G 5/34* (2025.01); *G08G 5/55* (2025.01); *G08G 5/57* (2025.01);
(Continued)

(58) Field of Classification Search
CPC .... G08G 5/0026; G08G 5/0039; G08G 5/006; G08G 5/0069; G08G 5/0091; G08G 5/045
See application file for complete search history.

(56) References Cited

U.S. PATENT DOCUMENTS

2017/0162060 A1* 6/2017 Boland ................ G08G 5/0034
2020/0233439 A1* 7/2020 Ivanov .................... G01P 5/001
(Continued)

FOREIGN PATENT DOCUMENTS

JP 2017516090 A 6/2017
JP 2018165931 A 10/2018
(Continued)

OTHER PUBLICATIONS

Machine translation of JP2018165932 (Year: 2018).*

*Primary Examiner* — Mohamad O El Sayah
(74) *Attorney, Agent, or Firm* — NKL LAW; Jae Youn Kim

(57) ABSTRACT

Proposed is a 4-dimensional path display method for an unmanned vehicle using a point cloud that makes it easy to control the unmanned vehicle and provides a minute and safe path in response to collision accidents during flight of unmanned vehicles by using the point cloud in the 3-dimensional airspace space to define and display the corridor that constitutes the flight path of the unmanned vehicle in detail and easily. The 4-dimensional path display method for an unmanned vehicle using a point cloud according to an embodiment of the present invention includes the steps of defining a 3-dimensional airspace space for generating a flight path of the unmanned vehicle, and generating and displaying the flight path of the unmanned vehicle using the point cloud in the 3-dimensional airspace space.

19 Claims, 10 Drawing Sheets

(51) Int. Cl.

| | |
|---|---|
| ***G08G 5/55*** | (2025.01) |
| ***G08G 5/57*** | (2025.01) |
| ***G08G 5/59*** | (2025.01) |
| ***G08G 5/76*** | (2025.01) |
| ***G08G 5/80*** | (2025.01) |

(52) U.S. Cl.

CPC ................. *G08G 5/59* (2025.01); *G08G 5/76* (2025.01); *G08G 5/80* (2025.01); *B64U 2201/10* (2023.01)

(56) References Cited

U.S. PATENT DOCUMENTS

| | | | | |
|---|---|---|---|---|
| 2020/0258399 | A1* | 8/2020 | Kuhara ................ | G08G 5/0013 |
| 2021/0264796 | A1* | 8/2021 | Chen ..................... | B64C 39/024 |
| 2022/0270495 | A1* | 8/2022 | Pele ..................... | G08G 5/0091 |
| 2023/0035682 | A1* | 2/2023 | Seo ...................... | G08G 5/0034 |

FOREIGN PATENT DOCUMENTS

| | | | |
|---|---|---|---|
| JP | 2018165932 | A | 10/2018 |
| JP | 2019163992 | A | 9/2019 |
| KR | 10-1990886 | B1 | 6/2019 |
| KR | 10-2020-0028210 | A | 3/2020 |
| KR | 10-2021-0004411 | A | 1/2021 |
| KR | 10-2199818 | B1 | 1/2021 |

* cited by examiner

4-DIMENSIONAL PATH DISPLAY METHOD FOR UNMANNED VEHICLE USING POINT CLOUD

TECHNICAL FIELD

The present invention relates to a 4-dimensional path display method for an unmanned vehicle using a point cloud that defines a corridor of a 3-dimensional airspace space using a point cloud and accordingly displays the 4-dimensional path of the unmanned vehicle.

BACKGROUND ART

Currently, a commercial and open source system for the Ground Control System, the system that flies or operates unmanned vehicles such as drones, mostly determines a flight path point or sets the height through mouse click events on a 2D-based map.

However, it is difficult for the 2D map to reflect actual environment information or to materialize flight information from a user's point of view. In addition, processing through mouse clicks has limitations in determining correct points or setting the height due to an error in determining the height of the same point and an error due to overlapping of the determined points.

3D map is sometimes used to solve these shortcomings of the 2D map. Processing using the 3D map has good visualization, reflection of the environment, and expansion of materialization. But, difficulty in a user interface due to 3D rendering, difficulty in clicking, zooming in, and zooming out due to 3D coordinates, elevation height and point determination, and rendering speed and performance problems occur.

In particular, the user needs to generate a flight path with accurate points capable of flying along an efficient route, but it is not easy to accurately determine desired corresponding points in a general 3-dimensional space.

To compensate for this, it has been recently proposed to divide a space into a cube shape such as a grid, but the cube or grid shape is not easy to visualize the surrounding environment as the complexity of the space increases. Moreover, it is difficult to process mouse events, such as clicking on the map, and to display and determine the path due to high complexity of visualizing the surrounding environment.

In addition, gridding is a method of managing spatial information, and it does not define or display a corridor space for a path of the unmanned vehicle (a drone path), but overlaps or occupies more space than necessary. Therefore, there is also a limit to displaying a corridor constitution for the flight path of the unmanned vehicle.

DISCLOSURE

Technical Problem

The present invention has been devised to solve the above problems, and an object of the present invention is to provide a 4-dimensional path display method for an unmanned vehicle using a point cloud to facilitate a control of the unmanned vehicle by defining and displaying a corridor constituting a flight path of an unmanned vehicle minutely and easily by using a point cloud in a 3-dimensional airspace space.

Another object of the present invention is to provide a 4-dimensional path display method for an unmanned vehicle using a point cloud, which simultaneously generates multiple paths within the 3-dimensional airspace space to allow a flight path of the unmanned vehicle to be variously selected.

In addition, another object of the present invention is to provide a 4-dimensional path display method for an unmanned vehicle using a point cloud that considers and interpolates environmental information of obstacles, buildings, and/or terrain in a traveling direction of a flight path, and then verifies and simulates it so as to provide a safe flight path, thereby preventing collision accidents of unmanned vehicles in advance.

The problems of the present invention are not limited to the problems mentioned above, and other problems not mentioned will be clearly understood by those skilled in the art from the following description.

Technical Solution

A 4-dimensional path display method using a point cloud according to an embodiment of the present invention for solving the above problems may include: defining a point cloud-based 3-dimensional airspace space for generating a flight path of an unmanned vehicle; and generating and displaying the flight path of the unmanned vehicle by using a point cloud in the 3-dimensional airspace space.

The flight path may be generated based on a point spacing, a point size, and display information of each point in the point cloud.

The generating and displaying the flight path may include: generating a 4-dimensional path by adding time information to the flight path generated using the point cloud.

The point spacing may be determined based on an initially determined default value, a value determined by a preset algorithm, a value determined by reflecting a surrounding environment of the 3-dimensional airspace space, or a parameter value changed by the user.

The 3-dimensional airspace space may be defined as a set of space vector points.

The space vector points each may have latitude and longitude, and height of the coordinate system of the earth's ellipsoid, and display at least one or more information of xyz coordinates, Render Indexes, flight point numbers, mission types, mission commands, and behavior patterns.

The space vector points may further include time vectors and display at least one or more information about an occupancy time and occupancy duration for the flight path of the unmanned vehicle, and mark information of the occupying unmanned vehicle.

The point size may be determined by predicting the space vector points of the flightable area of the unmanned vehicle based on weather information and wind strength at each point in the 3-dimensional airspace space, and size information of the unmanned vehicle.

The flight path may be indicated by a corridor.

The points and information constituting each corridor may be independently separated and managed.

The size of the in the corridor may be determined by diameter or cross-sectional area in the direction perpendicular to the traveling direction of the corridor in an occupying space according to a size of the points occupied by the path.

The size of the corridor may be determined by additionally reflecting an occupancy time and occupancy duration of the point over time, and mark information of an occupying unmanned vehicle.

The corridor may have at least one or more display information of a path ID, a path constitution type, an obstacle detection avoidance type, a distance from a starting point, and an arrival time according to a path setting speed.

The corridor may display differently the state of color and transparency according to a time sequence at each point in the space occupied by the path.

The corridor may display information of the unmanned vehicle occupied according to the time sequence at each point in the space occupied by the path, but displays the information of the unmanned vehicle in the order of occupying the corresponding points.

The defining the 3-dimensional airspace space may include: collecting 2-dimensional location information on a path generating area in which a flight path of the unmanned vehicle is generated; determining a range of the path generating area based on the collected 2-dimensional location information; defining a 3-dimensional airspace space by generating a point cloud airspace space composed of space vector points based on the determined range of the path generating area; changing the airspace space of the point cloud according to the surrounding environment of the 3-dimensional airspace space or a user request; and rendering the 3-dimensional airspace space.

In the point cloud airspace space, one or more of the point size, an x-axis, y-axis, and z-axis spacing between points, a weight for the point spacing, and the position in airspace space may be defined.

The changing the point cloud airspace space may change at least one or more parameter values among the point size, the x-axis, y-axis, and z-axis spacing between points, the weight for the point spacing, and the position in the airspace space.

The generating and displaying the flight path of the unmanned vehicle may include: selecting a starting point among space vector points in the 3-dimensional airspace space; predicting a space vector point of a flightable area based on weather information and wind strength information at the selected starting point, and size information of the unmanned vehicle, and displaying the information on the point as the size of the point; generating a departure corridor by reflecting the size and displayed information of each point; selecting a corridor constitution type and an obstacle detection avoidance type; and constituting n corridors based on the size of the displayed points.

The selecting a corridor constitution type and an obstacle detection avoidance type may include: selecting any one of constitution types of a user click type and an automated type to constitute a corridor for the flight path of the unmanned vehicle; and selecting an obstacle detection and avoidance type for any one of a corridor type and a curve type to configure an avoidance path when detecting obstacles in the traveling direction of the flight path.

The selecting an obstacle detection avoidance type may include: if the corridor type is selected, when detecting the obstacle in the traveling direction of a path, configuring the path by avoiding it to other space vector points in the vicinity; and if the curve type is selected, when detecting the obstacle in the traveling direction of a path, configuring the path by avoiding it to an interpolated point using the Bezier curve interpolation.

The generating and displaying the flight path of the unmanned vehicle further includes: when a starting point of the path configured in said constituting the corridor is changed, reconstituting the corridor based on the changed starting point.

The method may further include: verifying the path corresponding to the constituted n corridors and simulating the flight path according to the speed and time of the unmanned vehicle; and outputting entire corridors based on the verification and simulation results for the n corridors, and storing the outputted information of the entire corridors in the database corresponding to the path IDs.

The simulating the flight path may include: displaying a virtual path image and a virtual unmanned vehicle image for each path of the n corridors, and changing and displaying the location of the virtual unmanned vehicle image based on a flight plan depending on the speed and time of the unmanned vehicle set for each path.

Advantageous Effects

According to the embodiment of the present invention, it is possible to precisely and easily generate and display the flight path of the unmanned vehicle by defining the corridor using the point cloud in the 3-dimensional airspace space.

In addition, since the present invention utilizes the point cloud in generating the flight path in the 3-dimensional airspace space, multiple paths can be generated at the same time.

In addition, the present invention provides the safe flight path by considering and interpolating environmental information of obstacles, buildings, and/or terrain in the direction of travel of the flight path, and then verifying and simulating it, thereby minimizing the occurrence of a collision accident during flight of the unmanned vehicle.

Effects according to the present invention are not limited by the contents exemplified above, and more various effects are included in the present invention.

DETAILED DESCRIPTION OF EXEMPLARY EMBODIMENTS

Figure 1:
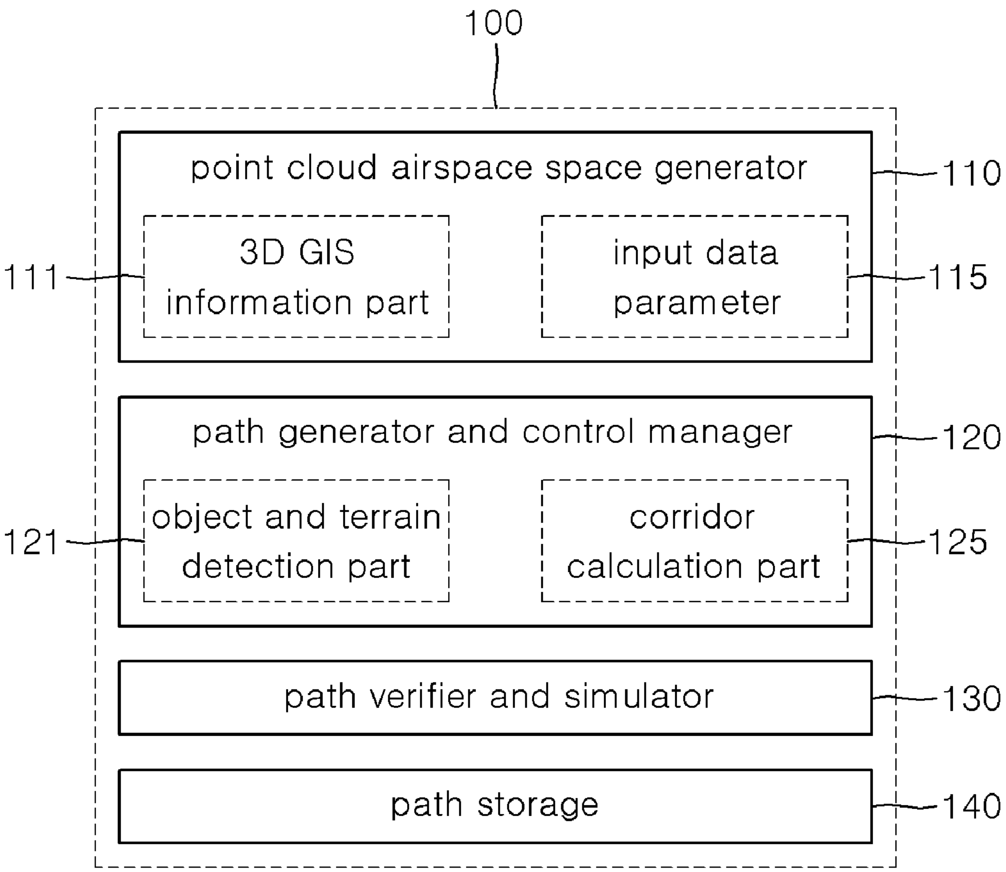
FIG. 1 is a diagram showing a system configuration according to an embodiment of the present invention.

Hereinafter, various embodiments will be described in more detail with reference to the accompanying drawings.

The embodiments described herein can be variously modified. Specific embodiments are described in the drawings and may be described in detail in the detailed description. It should be understood, however, that the specific embodiments disclosed in the accompanying drawings are intended only to facilitate understanding of various embodiments. Accordingly, it is to be understood that the technical idea is not limited by the specific embodiments disclosed in the accompanying drawings, but includes all equivalents or alternatives falling within the spirit and scope of the invention.

Terms including ordinals, such as first, second, etc., may be used to describe various elements, but such elements are not limited to the above terms. The above terms are used only for the purpose of distinguishing one component from another.

In this specification, the terms “comprises” or “having”, and the like, are intended to specify the presence of stated features, integers, steps, operations, elements, parts, or combinations thereof, but do not preclude the presence or addition of one or more other features, integers, steps, operations, elements, components, or combinations thereof. It is to be understood that when an element is referred to as being “connected” or “connected” to another element, it may be directly connected or connected to the other element. On the other hand, when an element is referred to as being “directly connected” or “directly connected” to another element, it should be understood that there are no other elements in between.

In the meantime, “module” or “part” for components used in the present specification performs at least one function or operation. Also, “module” or “part” may perform functions or operations by hardware, software, or a combination of hardware and software. Also, a plurality of “modules” or a plurality of “parts”, other than a” module “or” part”, to be performed in a specific hardware or performed in at least one processor may be integrated into at least one module. The singular expressions include plural expressions unless the context clearly dictates otherwise.

In addition, in the description of the present invention, when it is judged that the detailed description of known functions or constructions related thereto may unnecessarily obscure the gist of the present invention, the detailed description thereof will be abbreviated or omitted.

FIG. 1 is a diagram showing a system configuration according to an embodiment of the present invention.

Referring to FIG. 1, the system according to an embodiment of the present invention may include a point cloud airspace space generator 110, a path generator and control manager 120, a path verifier and simulator 130, and a path storage 140.

First, the point cloud airspace space generator 110 defines a 3-dimensional airspace space for generating a flight path of unmanned vehicles.

In this regard, the point cloud airspace space generator 110 collects location information of a path generating area in which the flight path is to be generated. Here, the point cloud airspace space generator 110 may directly receive input data 1150 for the location information of the path generating area from the user. On the other hand, the point cloud airspace space generator 110 may invoke location information of a predetermined area among the information stored in the 3D GIS information part 111 in order to generate the flight path. As an example, the location information of the path generating area may include local location information such as city, province, and county.

The point cloud airspace space generator 110 determines the range of the path generating area to cover location information of all regions inputted with respect to the path generating area. The point cloud airspace space generator 110 defines components (e.g. point size, point x-axis, y-axis, z-axis spacing, weights for point spacing, position in airspace space, etc.) for a point cloud airspace space based on the determined default value of the path generating area, and generates the point cloud airspace space composed of space vector points based on the defined components. Accordingly, the point cloud airspace space may be defined as a set of space vector points.

In this case, the generated point cloud airspace space may be defined and rendered as a 3-dimensional airspace space.

Here, the points constituting the point cloud airspace space are 3-dimensional space vector points, and each point has latitude and longitude, and height of EPSG: 4326 (WGS84), which is the coordinate system of the Earth’s ellipsoid. In this case, each point displays information that affects the airspace and the movement of unmanned vehicles, such as airspace spatial xyz coordinates, Render Indexes for search and visualization, flight point numbers, mission types, mission commands and behavior patterns.

The points may further include time vectors. In this case, a point is a 4-dimensional space and time vector point, and the point displays information that affects the airspace and the movement of unmanned vehicles, such as occupancy time and occupancy duration of a flight path by an unmanned vehicle that has already been planned and stored, and mark information of an occupying unmanned vehicle.

The spacing of the space vector points may be determined as an initially determined default value or may be determined by a preset algorithm. Meanwhile, the spacing of the space vector points may be changed by reflecting surrounding environment such as a terrain feature in the point cloud airspace space. The spacing of the space vector points may be adjusted by changing parameter values of the components for the point cloud airspace space.

The path generator and control manager 120 may include an object and terrain detection part 121 that detects objects and terrain in the 3-dimensional airspace space, and corridor calculation part 125 that calculates corridors based on space vector points and the detected objects and terrain in the 3-dimensional airspace space.

The path generator and control manager 120 may predict the space vector points of the flightable area of the unmanned vehicle based on information such as weather information and wind strength at each point in the 3-dimensional airspace space, and size of the unmanned vehicle, and then display information of that point as the size of the point. Accordingly, the size of the space vector points in the 3-dimensional airspace space may vary depending on the weather information, the wind strength of the corresponding point, and the size of the unmanned vehicle.

On the other hand, when a starting point is selected from among the space vector points in the 3-dimensional airspace space, the path generator and control manager 120 creates a departure corridor with a path size reflecting the size of the space vector points of the flightable area based on the starting point.

The flight path according to an embodiment of the present invention may be displayed as the corridor. Accordingly, the corridor calculation part 125 may calculate a plurality of flight paths by using the point cloud of the flightable area, and constitute the corridors based on the calculated plurality of flight paths. As an example, the corridor calculation part 125 may calculate a 3-dimensional flight path based on a spacing between points, the size of the points, and display information of the points, and display information related thereto.

The corridor calculation part 125 may constitute a plurality of (n) corridors based on a preset corridor constitution type and obstacle detection avoidance type.

As the corridor constitution type, any one of a user click type and an automated type may be selected. In the user click type, when the user selects the point cloud by clicking a desired direction with a virtual keyboard, a path is generated according to the selected point cloud, and the path to an arrival point is generated through the spatial coordinate linear interpolation of the traveling direction between points. The automated type enters an arrival point and a right or left mode, or sets an automated mode by a start point, an arrival point, latitude and longitude, and angle. In this case, a path is generated based on a space vector point having a shortest distance among all possible paths from the starting point to the arrival point.

As the obstacle detection avoidance type, any one of a corridor type and a curve type may be selected. In the corridor type, when an obstacle is detected in the traveling direction on a path of the point cloud airspace space, it avoids to another space vector point to generate the path. In the curve type, when an obstacle is detected on a path in the airspace space, the path is generated by avoiding the obstacle to an interpolated point using the Bezier curve interpolation with respect to spatial coordinates of the traveling direction between points.

In this case, the points and information constituting each corridor may be separately stored and managed independently.

In this case, the size of the constituted corridor may be determined according to the size of points corresponding to an occupied space. Here, the size of the corridor means a diameter or a cross-sectional area in a direction perpendicular to the traveling direction of the corridor.

Additionally, the corridor may be constituted by reflecting the point information over time, for example, the occupancy time and the occupancy duration of the flight path by the unmanned vehicle, and the information on the mark of the occupying unmanned vehicle.

Each corridor may display predetermined information, for example, a path ID, a corridor constitution type (a user click type, an automated type), an obstacle detection and avoidance type (a corridor type, a curve type) for buildings and terrain on the path, and the distance from the starting point, the total arrival time according to a path setting speed. In this regard, each corridor may vary the display state at the point, for example, color, transparency, etc. according to the time sequence, and display information such as the id of the unmanned vehicle occupying the points according to the time sequence, wherein information of the corresponding unmanned vehicle may be displayed in the order of occupying the corresponding points.

The path verifier and simulator 130 verifies and simulates paths for each corridor. The path verifier and simulator 130 may verify the path and perform a simulation according to the speed and time of the unmanned vehicle.

In the path storage 140, the output of all corridors verified by the path verifier and simulator 130 is displayed on the 3-dimensional airspace space. In this case, the outputs of all corridors may be matched to the path IDs and stored in each database of the path storage 140.

An operation flow of the system constructed as described above will be described with reference to FIG. 2.

Figure 2:
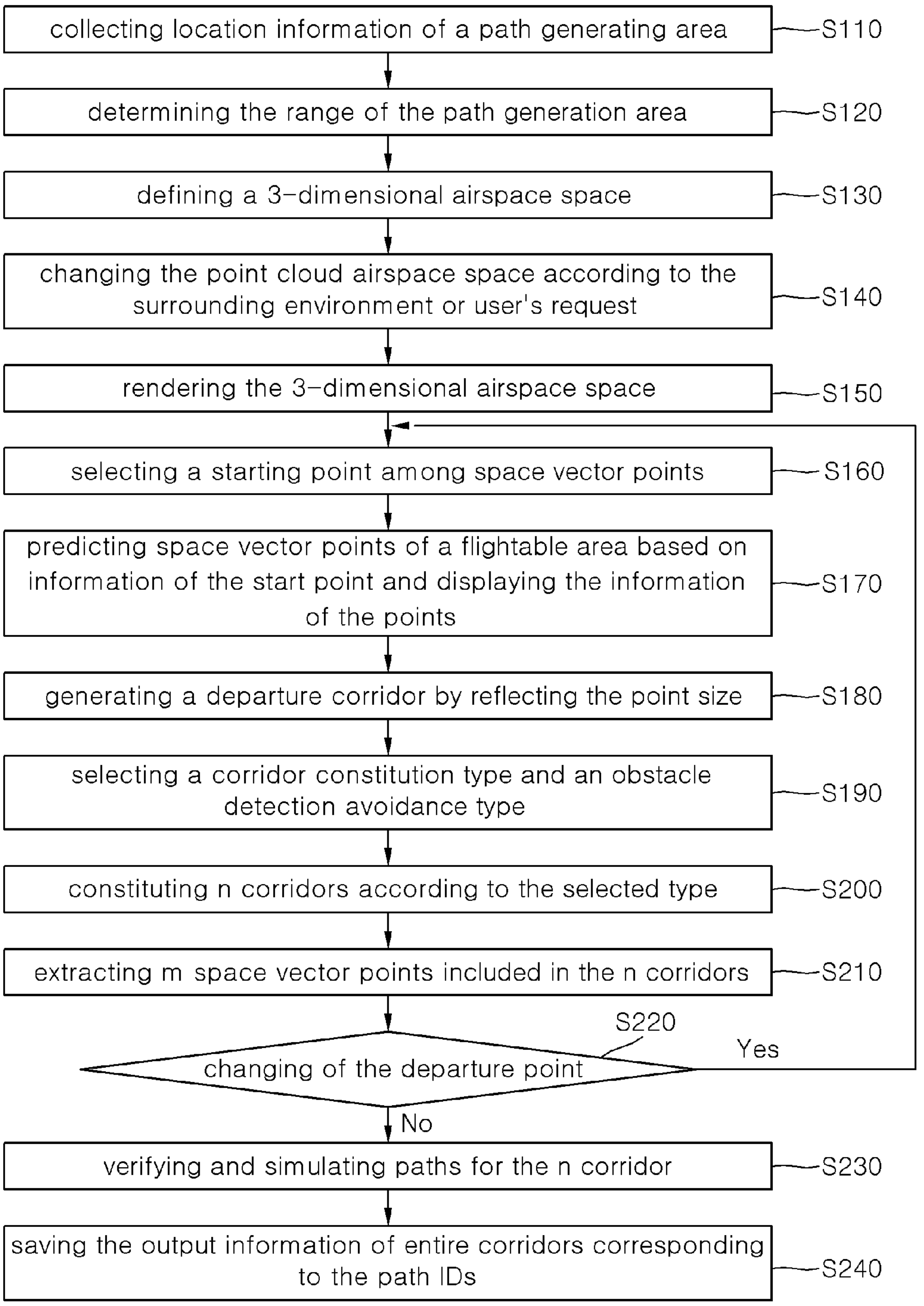
FIG. 2 is a flowchart illustrating a 4-dimensional path display method for an unmanned vehicle using a point cloud according to an embodiment of the present invention.

FIG. 2 is a flowchart illustrating a 4-dimensional path display method for an unmanned vehicle using a point cloud according to an embodiment of the present invention.

Referring to FIG. 2, the 4-dimensional path display method of an unmanned vehicle using a point cloud may include largely: the steps of defining a 3-dimensional airspace space and generating and displaying flight paths of the unmanned vehicle.

First, the step of defining the 3-dimensional airspace space may include in detail: steps of collecting 2-dimensional location information on a path generating area for generating the flight paths of the unmanned vehicle (S110); determining the range of the path generating area based on the collected 2-dimensional location information (S120); generating a point cloud airspace space composed of space vector points based on the determined range of the path generating area to define a 3-dimensional airspace space (S130); changing the point cloud airspace space according to surrounding environment of the 3-dimensional airspace space or user's request (S140); and rendering the 3-dimensional airspace space (S150).

In the step of collecting location information (S110), location information for at least one or more area may be collected, and in this case, location information of the path generating area may be directly inputted from a user; or location information of a predetermined area, for example, local location information of a city, province, county and the like from the information stored in the 3D GIS information part may be invoked to generate the flight paths.

In the step of determining the range of the path generating area (S120), the range of the path generating area is determined to cover location information of all area inputted for the path generating area.

In the step of defining the 3-dimensional airspace space (S130), the point cloud airspace space is generated based on the predetermined range of the path generating area, and the 3-dimensional airspace space is defined based on the generated point cloud airspace space.

In the step of changing the point cloud airspace space (S140), the user may arbitrarily change parameter values of the components. Meanwhile, the parameter values of the components may be changed according to surrounding environments such as obstacles in the point cloud airspace space.

In the step of rendering the 3-dimensional airspace space (S150), the 3-dimensional airspace space is rendered based on the components defined for the point cloud airspace space.

In this case, the 3D airspace space includes a plurality of space vector points, and a spacing between the space vector points may be determined by an initially determined default value or may be determined by a preset algorithm.

Meanwhile, the spacing of the space vector points may be changed by reflecting the surrounding environment such as a terrain feature in the point cloud airspace space. The spacing of the space vector points may be adjusted by changing the parameter values of the components for the point cloud airspace space in the step of changing the point cloud airspace space (S140).

When a no-fly zone exists in the point cloud airspace space, it may be displayed differently to distinguish the color of the airspace between the no-fly zone and the permit zone.

The step of generating and displaying the flight path of the unmanned vehicle may include in detail: steps of selecting a starting point among space vector points in the 3-dimensional airspace space (S160); predicting space vector points of a flightable area based on the weather information and wind strength information at the starting point selected in the process of performing 'S160', and the size information of the unmanned vehicle and displaying the information of the points as the size of the point (S170); constituting n corridors based on the size information of the points displayed in the process of performing 'S170' (S180~S210); verifying the paths for the n corridors and simulating the flight paths according to the speed and time of the unmanned vehicle (S230); and outputting entire corridors based on the verification and simulation results for the n corridors, and saving the output information of the entire corridors in the database corresponding to the path IDs (S240).

In the step of displaying as the size of the point (S170), the space vector points of the flightable area of the unmanned aerial vehicle are predicted based on information such as the weather information, the wind strength, and the size of the unmanned vehicle.

The size of each space vector point may be determined based on the weather information and the wind strength information at each point, and the size information of the unmanned vehicle. Accordingly, in the step of displaying as the size of the point (S170), when the size of each space vector point is determined, the size is reflected to each point in the 3-dimensional airspace space.

In addition, the space vector points may display predetermined information in the 3-dimensional airspace space. The space vector points each basically has latitude and longitude, and height of EPSG: 4326 (WGS84), which is the coordinate system of the earth ellipsoid, and each point displays information that affects the airspace and the movement of unmanned vehicles such as airspace spatial xyz coordinates, Render Indexes for search and visualization, flight point numbers, mission types, mission commands and behavior patterns.

Meanwhile, the space vector points may further include time vectors. In this regard, 4D space and time vector points display information that affects the airspace and the movement of the unmanned vehicle, such as the occupancy time and occupancy duration of the flight path by the unmanned vehicle, and mark information of the occupying unmanned vehicle.

The step of constituting n corridors (S180-S210) includes in detail: steps of generating a departure corridor by reflecting the size of each point and the displayed information (S180); selecting a corridor constitution type and an obstacle detection avoidance type (S190); constituting n corridors according to the type selected in the process of performing 'S190' (S200), and extracting m space vector points included in the n corridors (S210).

In the step of generating a departure corridor (S180), a path size is determined by reflecting the point size of each point, and the departure corridor is generated according to the determined path size.

In the step of selecting a corridor constitution type and an obstacle detection avoidance type (S190), either a user click type or an automated type may be selected.

The user click type generates a path (a drone path) according to the point cloud selected by clicking a desired direction to the arrival point with the virtual keyboard, performs linear interpolation on the spatial coordinates of the traveling direction between the points, and renders the generated path (the drone path). If there are obstacles, buildings, or terrain in the traveling direction during constituting the corridor by the user click type, it may be notified and the constitution of the path in the corresponding direction may be blocked.

Figure 3:
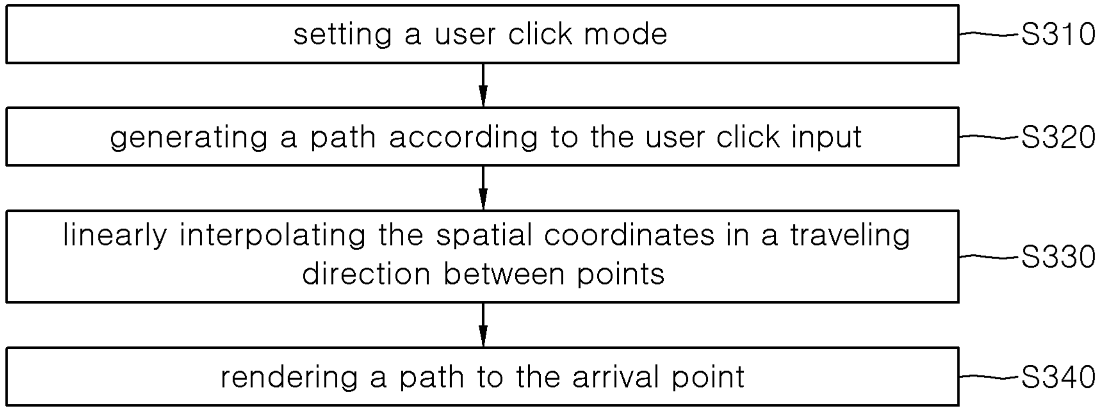
FIG. 3 is a flowchart illustrating a detailed operation of constituting a corridor in a user click mode according to an embodiment of the present invention.

For detailed operations of constituting the corridor path according to a constitution type by the user click type, refer to the embodiment of FIG. 3.

For the automated type, the arrival point, the right mode or the left mode is inputted, or an automated mode is set by the latitudes, longitudes and angles of the start point and the arrival point. In this case, the path is calculated based on space vector points with the shortest distances. If there are obstacles, buildings, and terrain in front of the traveling path during the corridor constitution of the automated type, an avoidance path is calculated according to the selected obstacle detection and avoidance type, and a finally calculated path is rendered.

Figure 4:
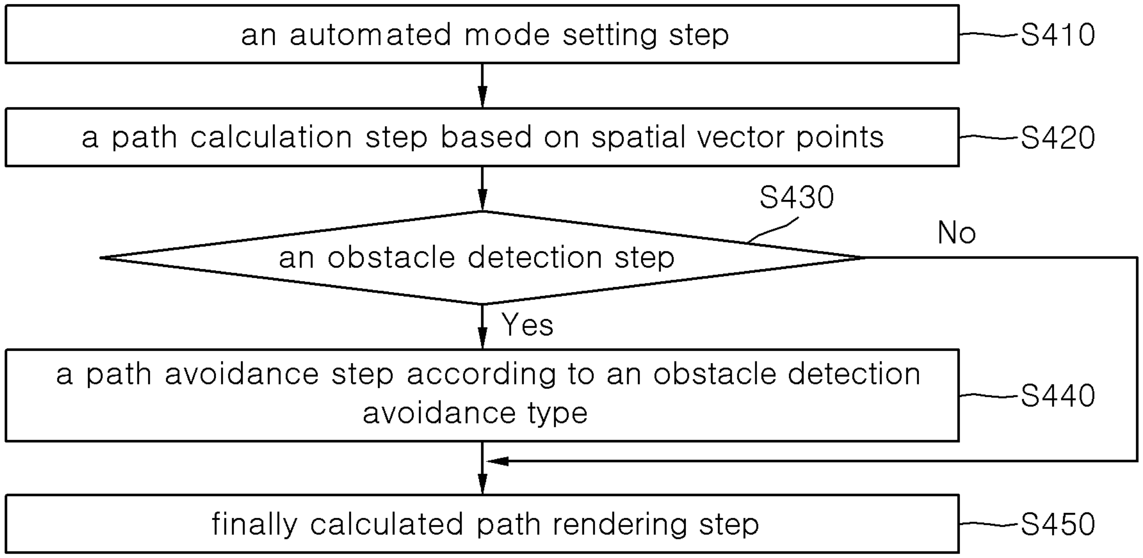
FIG. 4 is a flowchart illustrating a detailed operation of constituting a corridor in an automated mode according to an embodiment of the present invention.

For detailed operations of constituting the corridor path according to the constitution type by the automated type, refer to the embodiment of FIG. 4.

As a method of detecting an obstacle, it may be detected based on location information of a terrain feature in the point cloud airspace space. In this case, when configuring a path including the points disposed at a location close to the location of the terrain feature, the obstacle may be detected based on the traveling direction of the path from the corresponding points and the location of the terrain feature.

As another method of detecting an obstacle, it may be detected as the obstacle based on path information pre-occupied by other unmanned vehicles. In this case, it may be possible to detect an obstacle when configuring a path, including points placed at positions corresponding to paths pre-occupied by other unmanned vehicles.

As the obstacle detection avoidance type, either a corridor type or a curve type may be selected.

The corridor type allows to avoid it to other space vector points nearby when detecting obstacles in the traveling direction of the path.

The curve type allows to avoid it to an interpolated point using the Bezier curve interpolation when detecting obstacles in the traveling direction of the path.

In the step of constituting n corridors (S200), n corridors are constituted in the 3-dimensional airspace space through the processes of performing 'S180' and 'S190'.

In the corridor constituted through the processes of performing 'S180' to 'S200', the size of the path, that is, the size of the corridor, may be determined according to the size of the points included in the space occupied by the path. Here, the size of the corridor means a diameter or cross-sectional area in the direction perpendicular to the traveling direction of the corridor.

In addition, the corridor may be additionally determined by reflecting the display information of the points over time, that is, the occupancy time and the occupancy duration of the path by the unmanned vehicle, and the mark information of the occupying unmanned vehicle.

The corridor constituted in this way may display predetermined information. In this case, the displayed information of the corridor may include a path ID, a corridor constitution type (e.g., a user click type, an automated type) and/or an obstacle detection avoidance type (e.g., a corridor type, a curve type), the distance from the starting point, and the total arrival time according to the path setting speed.

In this case, the corridor may be displayed by varying the display state (e.g., color, transparency, etc.) according to the time sequence at each point of the space occupied.

In addition, the corridor may display information (e.g., id, etc.) of the unmanned vehicle occupying each point in the occupied space according to the time sequence in the order of occupancy.

When the constituting of the n corridors is completed in the process of performing 'S200', m space vector points included in the n corridors are extracted (S210).

The m space vector points extracted in the process of performing 'S210' and their information may be managed separately in order to generate and manage a plurality of flight paths separately from the space vector points in the 3-dimensional airspace space.

If the starting point is selected again in this process or during the constitution of the corridors, the n corridors may be reconstituted by performing the process after 'S150' again. When constituting a corridor, a previously constituted corridor may be deleted or reconstituted in the middle.

If the verification is failed in the step of verifying and simulating paths for the n corridors (S230), the corridors may be reconstituted. In this case, it is also possible to reconstitute a corridor for a path that has failed verification.

In the storing step (S240), when the verification and simulation of all the paths are completed in the step of verifying and simulating the paths for the n corridors (S230), the information of the entire corridors is outputted and the outputted information of the entire corridors is stored in the database corresponding to the IDs of the paths.

FIG. 3 is a flowchart illustrating a detailed operation of constituting a corridor by a constitution type of the user click type according to an embodiment of the present invention.

Referring to FIG. 3, when the corridor is constituted according to a constitution type of the user click type, steps of setting a user click mode (S310), generating a path (S320), interpolating (S330), and rendering the path (S340) may be included.

In the path generation step (S320), a path is generated based on points selected according to a user's click input such as up, down, left, and right to the arrival point using the virtual keyboard.

In the interpolation step (S330), linear interpolation is performed on spatial coordinates in the traveling direction between the points.

In the path rendering step (S340), the path generated according to a user's click input is rendered to the arrival point.

Although not shown in FIG. 3, when an obstacle, a building, or a terrain exists in the traveling direction during the corridor constitution of the user click type, this may be notified and the path configuration in the corresponding direction may be blocked.

FIG. 4 is a flowchart illustrating a detailed operation of constituting a corridor by a constitution type of the automated type according to an embodiment of the present invention.

Referring to FIG. 4, when a corridor is constituted according to the corridor constitution type of the automated type, an automated mode setting step (S410), a path calculation step (S420), obstacle detection and avoidance steps (S430 and S440), and a path rendering step (S450) may be included.

In the automated mode setting step (S410), the arrival point, the right mode, or the left mode is inputted or the automated mode is set by the latitude and longitude, and angles of the departure point and the arrival point.

The path calculation step (S420) calculates a path based on the space vector points with the shortest distances to the arrival point based on the information set in the automated mode setting step (S410).

In the obstacle detection and avoidance steps (S430 and S440), when an obstacle, a building, or a terrain is detected in front of a traveling path (S430), an avoidance path is calculated according to the obstacle detection avoidance type (e.g., a corridor type, a curve type) selected in the process of performing 'S190' of FIG. 2.

In the path rendering step (S450), when a final path is calculated through the path calculation step (S420) and the obstacle detection and avoidance steps (S430 and S440), the final calculated path is rendered.

Figure 5:
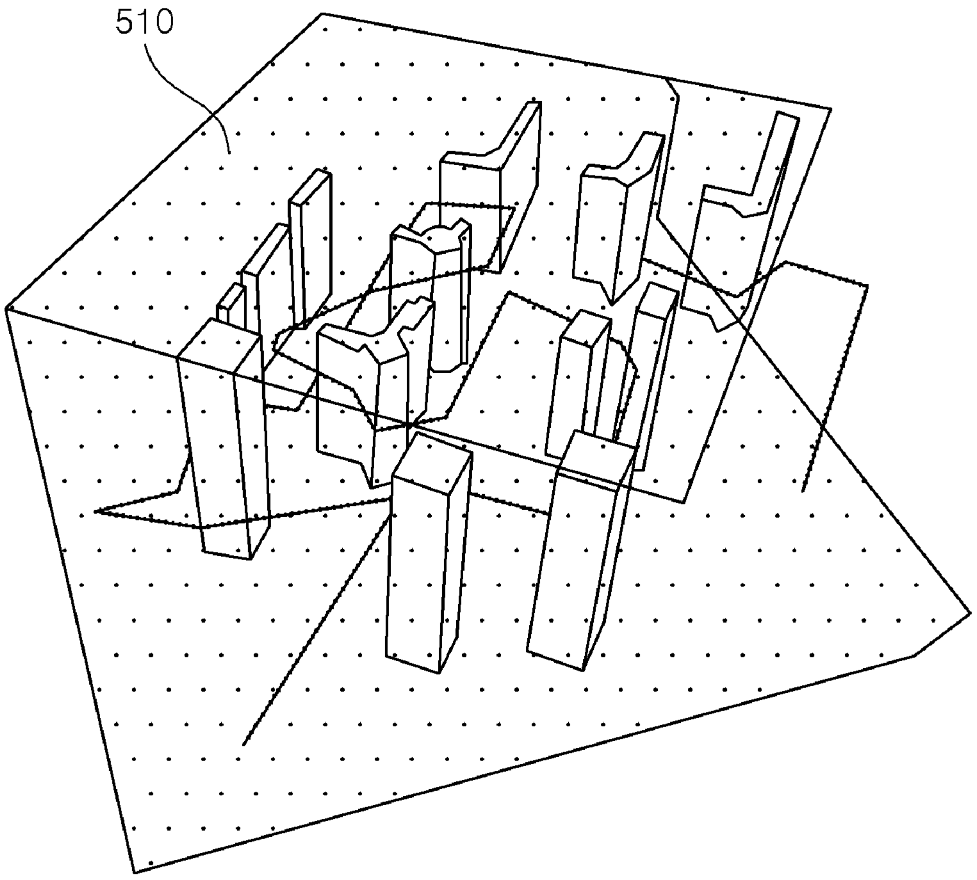
FIG. 5 is a diagram illustrating a point cloud airspace space according to an embodiment of the present invention.

FIG. 5 is a diagram illustrating a point cloud airspace space according to an embodiment of the present invention.

Referring to FIG. 5, points in the point cloud airspace space 510 is defined as basic space vector points, and the point cloud airspace space is defined as a set of points.

In the point cloud airspace space 510 composed of a set of points, the spacing of each point may be determined as a default spacing corresponding to horizontal and vertical values of the area range when the user clicks and sets the area to display the path, or may be determined as a spacing derived by a preset algorithm.

In this case, when the path of the unmanned vehicle is displayed based on each space vector points in the point cloud airspace space 510, the space is not complicated compared to a conventional cube or grid shape, and thus recognition and visualization of the surrounding environment are improved, resulting in an easy constitution and display of the path corridor of the unmanned vehicle.

Figure 6:
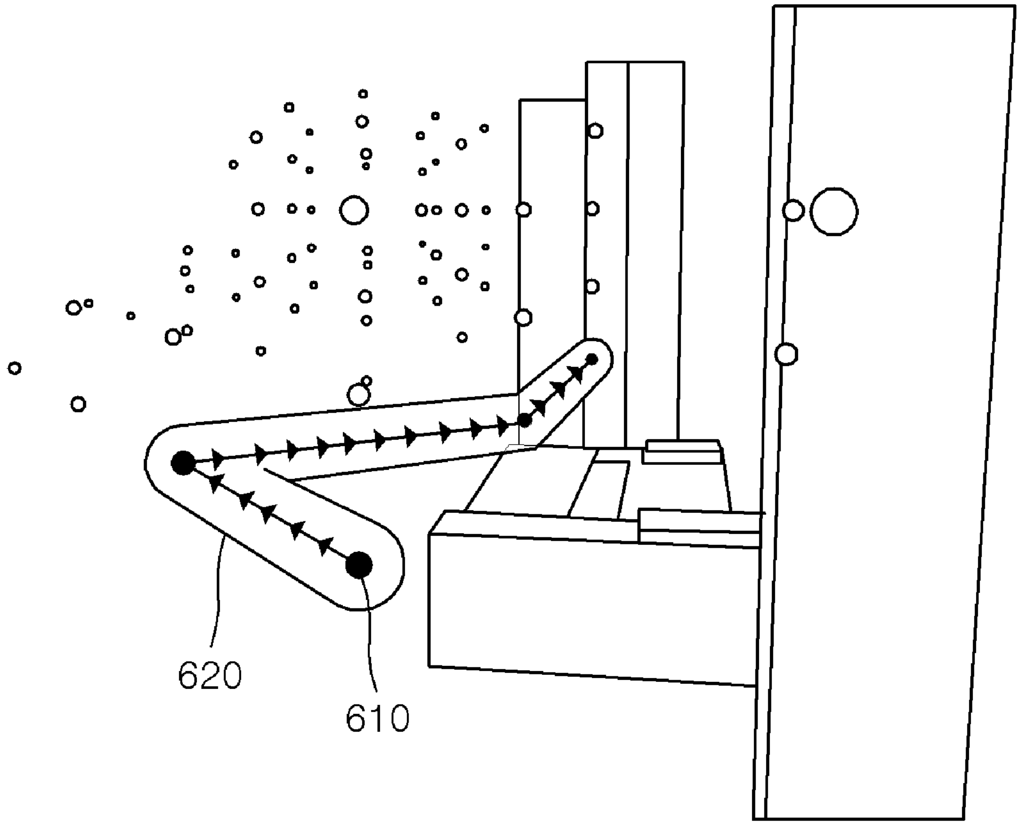
FIG. 6 is an exemplary diagram illustrating operations of generating a point cloud path corridor and detecting an object according to an embodiment of the present invention.

FIG. 6 is a diagram exemplarily illustrating an operation of generating a path corridor and detecting an object according to an embodiment of the present invention.

Referring to FIG. 6, when any one of the space vector points in the point cloud airspace space is selected as a starting point 610, a corridor may be constituted by calculating a path 620 starting from the selected starting point 610.

The size of the space vector points is determined based on the weather information and the wind strength information of each point, and the size information of the unmanned vehicle. The path size is determined by reflecting the point size of each of these points, and a departure corridor is generated according to the determined path size.

When an obstacle is detected while constituting the corridor, the corridor may be constituted by calculating a path in the direction to avoid the obstacle.

In this case, a plurality of (n) corridors may be constituted in the point cloud airspace space.

Figure 7:
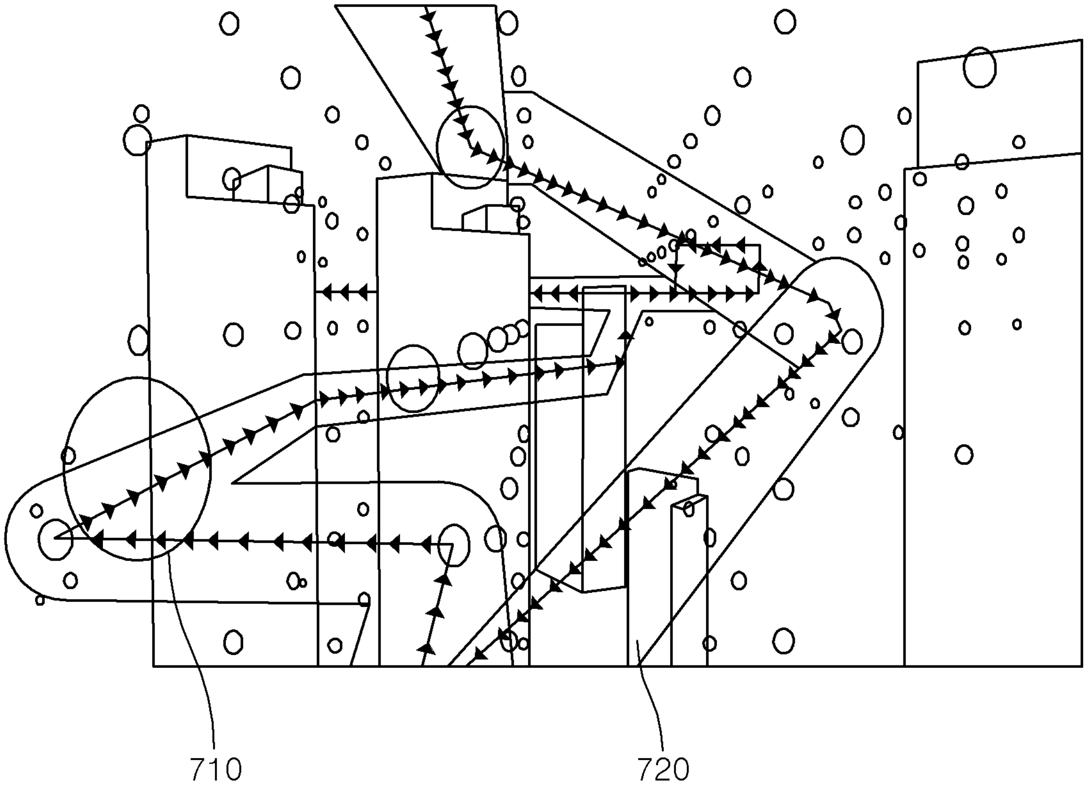
FIG. 7 is a diagram illustrating a flight path according to an embodiment of the present invention.

FIG. 7 is a diagram illustrating a corridor path according to an embodiment of the present invention.

Referring to FIG. 7, the size of each space vector point 710 in the point cloud airspace space may be determined based on the weather information and the wind strength information at each point, and the size information of the unmanned vehicle.

In this case, in the corridor 720, the size of the paths, that is, the size of the corridor, may be determined according to the size of the points 710 occupied by the paths. Here, the size of the corridor 720 means the diameter or cross-sectional area in the direction perpendicular to the traveling direction of the corridor 720.

In addition, the corridor 720 is additionally determined by reflecting the display information of the points over time, that is, the occupancy time and the occupancy duration of the path by the unmanned vehicle, and the mark information of the occupying unmanned vehicle.

Figure 8:
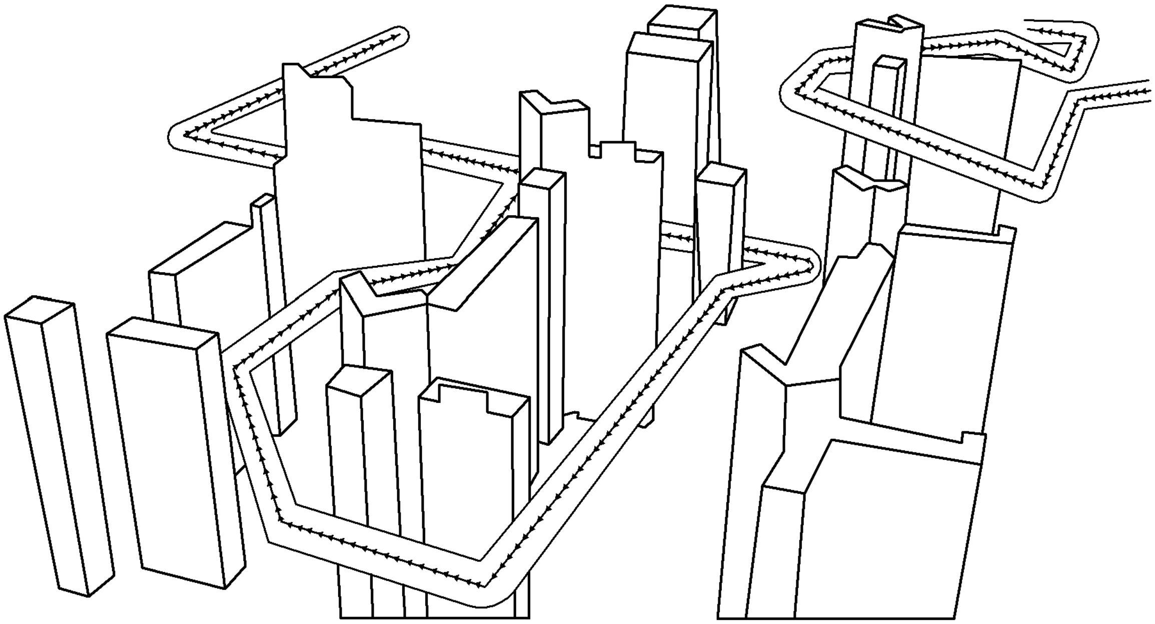
FIG. 8 is an exemplary diagram illustrating a first operation of displaying a flight path in a 3-dimensional airspace space according to an embodiment of the present invention.
Figure 9:
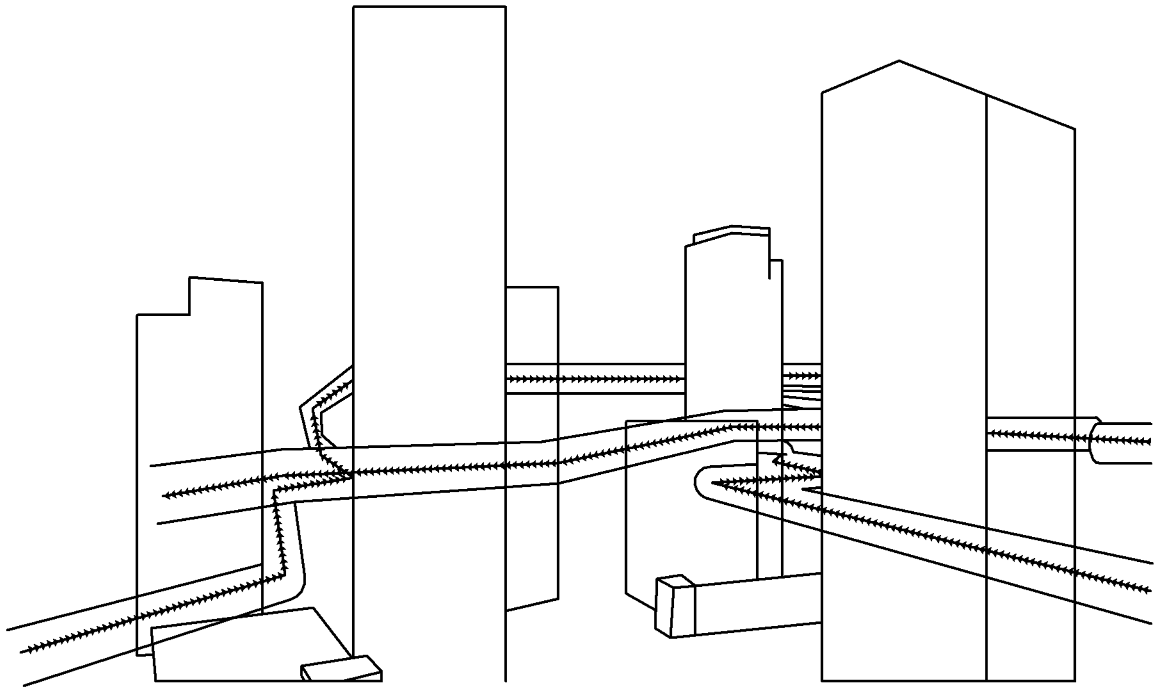
FIG. 9 is an exemplary diagram illustrating a second operation of displaying a flight path in a 3-dimensional airspace space according to an embodiment of the present invention.

FIGS. 8 and 9 are exemplary diagrams showing the operation in which paths of a plurality of corridors are displayed in the 3-dimensional airspace space according to an embodiment of the present invention.

A plurality of (n) corridors may be constituted in the point cloud airspace space, and the paths of the plurality of corridors constituted in this way may be displayed in the 3-dimensional airspace space.

In this case, the paths of a plurality of corridors may be displayed in various forms as shown in FIGS. 8 and 9.

As an example, the corridor may be displayed by varying colors or transparency according to a time sequence at each point occupied by the path.

Figure 10:
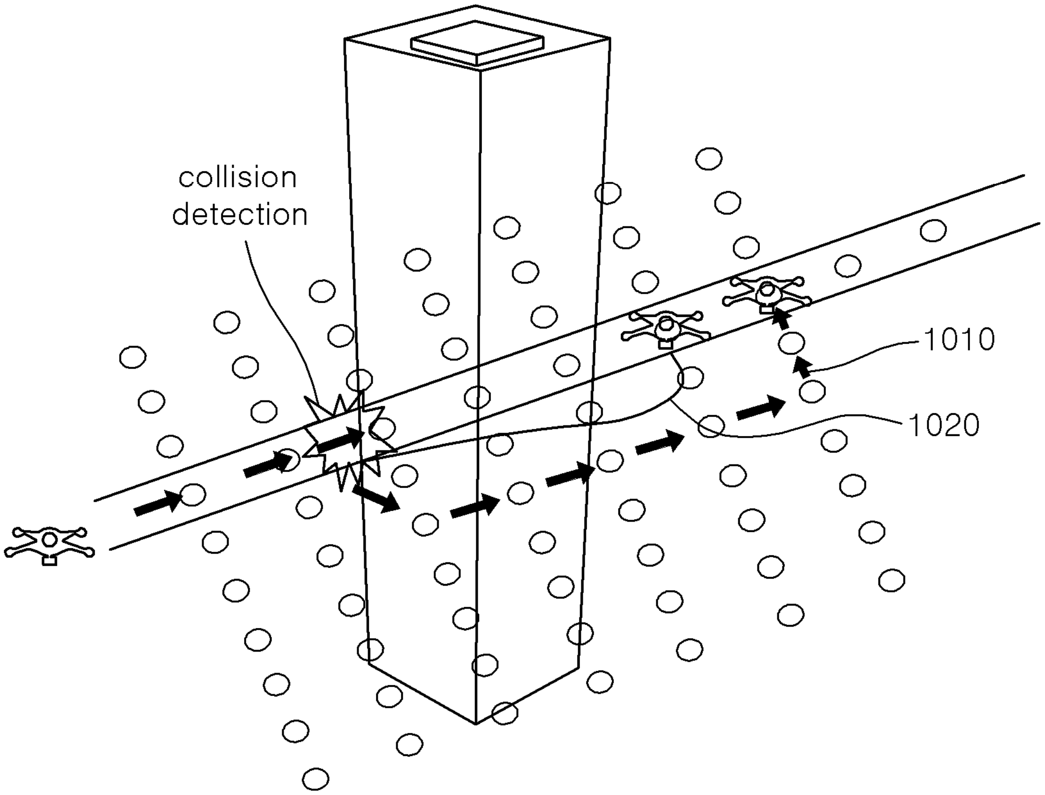
FIG. 10 is an exemplary diagram illustrating a collision detection and avoidance type of a flight path according to an embodiment of the present invention.

FIG. 10 is the exemplary diagram illustrating a collision detection and avoidance type of a path according to an embodiment of the present invention.

Referring to FIG. 10, when configuring a path of the corridor, obstacles such as buildings, structures, terrain features, and paths pre-occupied by other unmanned vehicles may be detected in the traveling directions of the paths.

In this way, when an obstacle is detected in the traveling direction of a path, the path is configured by avoiding the obstacles in order to prevent the unmanned vehicles from colliding with the obstacles during the flight of the unmanned vehicles.

As the obstacle detection avoidance type, either the corridor type or the curve type may be selected.

When an obstacle is detected in the traveling direction of the path and the collision is expected, the corridor type 1010 may prevent collision with the obstacle by configuring a path by selecting another space vector points in the vicinity of the path to avoid the obstacle. When configuring the path that avoids an obstacle, the curve type 1020 does not configure a path based on space vector points around it, but prevents collision with the obstacle by configuring the path by avoiding it to an interpolated points using the Bezier curve interpolation for the section in which the obstacle exists.

Figure 11:
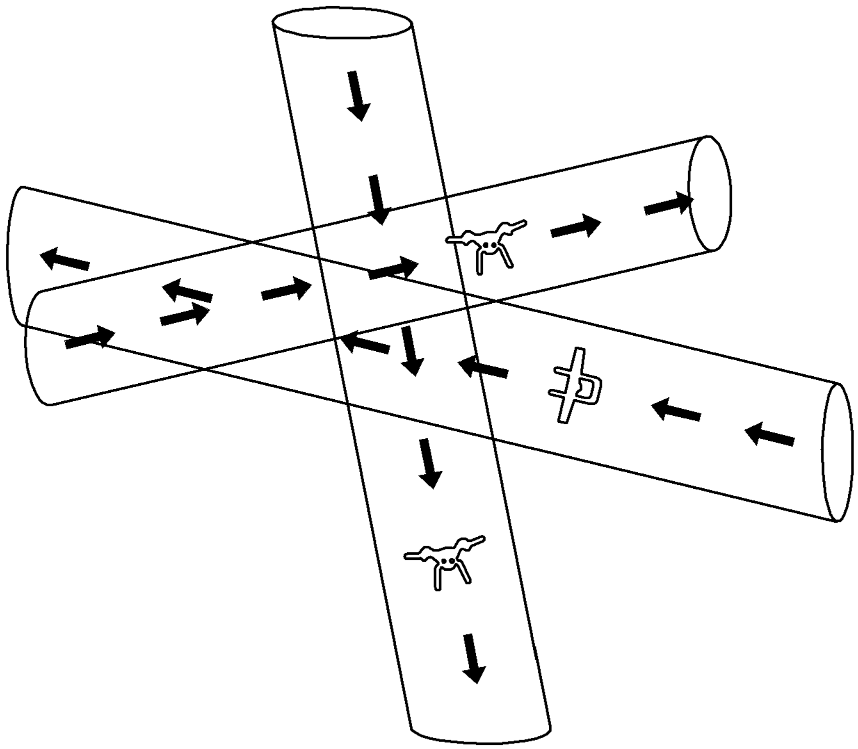
FIG. 11 is an exemplary diagram illustrating an operation of simulating a flight path according to an embodiment of the present invention.

FIG. 11 is an exemplary diagram illustrating the operation of verifying and simulating a path of a corridor according to an embodiment of the present invention.

Referring to FIG. 11, a space occupied by each path for n corridors may partially overlap. Accordingly, when unmanned vehicles fly along each path for the n corridors, an accident in which they collide with each other in the predetermined section may occur.

On the other hand, when flying along the paths of the corridors, an accident that collides with an obstacle may occur due to the influence of the surrounding environment.

In order to prevent this, it is possible to check in advance whether collisions between unmanned vehicles or collision accidents with the obstacle occurs by performing flight simulation virtually according to the plan set in the path of each corridor.

As an example, the simulation operation for flight paths displays virtual path images and virtual unmanned vehicle images for each path of the n corridors, and varying the positions of the virtual unmanned vehicle images and displaying them, based on the flight plans according to the speed and time of the unmanned vehicles set for each path, so that the flight status of the unmanned vehicles f can be checked or each path.

If a predetermined collision occurs in the course of the path simulation, it is considered that the verification has been failed and the path of the corridor may be reconstituted. In this case, only the paths of some corridors may be reconstituted.

Meanwhile, when the path verification and simulation for the n corridors are completed, output information of the entire corridors is stored and managed in the database corresponding to the IDs of the paths.

As described above, according to the embodiment of the present invention, a corridor is defined using the point cloud in a three-dimensional space, so that flight paths of unmanned vehicles may be precisely and easily generated and displayed.

In addition, since the present invention utilizes the point cloud in generating the flight paths in the 3-dimensional space airspace, multiple paths may be generated at the same time.

In addition, the present invention provides a safe flight path by reflecting environmental information of obstacles, buildings, and/or terrain in the traveling direction of the flight path for interpolating it, and verifying and simulating the flight path, thereby minimizing the occurrence of collision accidents during flight of the unmanned vehicles.

In the above, preferred embodiments of the present invention have been illustrated and described, but the present invention is not limited to the specific embodiments described above, various modifications can be made by those of ordinary skill in the art to which the invention pertains without departing from the gist of the invention as claimed in the claims, of course, and these modifications should not be individually understood from the technical spirit or prospect of the present invention.

INDUSTRIAL APPLICABILITY

The present invention discloses a 4-dimensional path display method for an unmanned vehicle using a point cloud that makes it easy to control the unmanned vehicle and provides a detailed and safe path in response to collision accidents during flight of unmanned vehicles by using the point cloud in the 3-dimensional airspace space to define and display the corridor that constitutes the flight path of the unmanned vehicle in detail and easily.

The invention claimed is:

1. A 4-dimensional path display method for an unmanned vehicle using a point cloud, the method comprising:

automatically defining a point in a cloud-based 3-dimensional airspace space for generating a flight path of an unmanned vehicle;

automatically selecting a starting point among space vector points in the cloud-based 3-dimensional airspace space;

automatically predicting a space vector point of a flightable area based on weather information and wind strength information at the selected starting point, and size information of the unmanned vehicle, and displaying information on the point as a point size;

automatically generating a departure corridor by reflecting the point size and displayed information of each point;

automatically selecting a corridor constitution type and an obstacle detection avoidance type;

automatically constituting n corridors based on a size of displayed points;

automatically generating the flight path based on a point spacing, the point size, and display information of each point in the point cloud; and automatically generating and automatically displaying the flight path of the unmanned vehicle by using the point cloud in the cloud-based 3-dimensional airspace space.

2. The method according to claim 1, wherein said generating and displaying the flight path includes:

generating a 4-dimensional path by adding time information to the flight path generated using the point cloud.

3. The method according to claim 1, wherein the point spacing is determined based on an initially determined default value, a value determined by a preset algorithm, a value determined by reflecting a surrounding environment of the cloud-based 3-dimensional airspace space, or a parameter value changed by a user.

4. The method according to claim 1, wherein the cloud-based 3-dimensional airspace space is defined as the set of the space vector points, and each of the space vector points has latitude and longitude, and height of a coordinate system of an earth's ellipsoid, and displays at least one or more information of xyz coordinates, Render Indexes, flight point numbers, mission types, mission commands, and behavior patterns.

5. The method according to claim 4, wherein the space vector points further include time vectors and display at least one or more information about an occupancy time and occupancy duration for the flight path of the unmanned vehicle, and mark information of the unmanned vehicle.

6. The method of claim 1, wherein the point size is determined by predicting the space vector points of the flightable area of the unmanned vehicle based on weather information and wind strength at each point in the 3-dimensional airspace, and size information of the unmanned vehicle.

7. The method according to claim 1, wherein the flight path is indicated by a corridor, and the points and information constituting each corridor are independently separated and managed.

8. The method according to claim 7, wherein a size of the corridor is determined by a diameter or a cross-sectional area in a direction perpendicular to a traveling direction of the corridor in an occupying space according to the point size occupied by the flight path.

9. The method according to claim 8, wherein the size of the corridor is determined by additionally reflecting an occupancy time and occupancy duration of points over time, and mark information of the unmanned vehicle.

10. The method according to claim 7, wherein the corridor has at least one or more display information of a path ID, a path constitution type, an obstacle detection avoidance type, a distance from a starting point, and an arrival time according to a path setting speed.

11. The method according to claim 7, wherein the corridor displays differently a state of color and transparency according to a time sequence at each point in a space occupied by the flight path.

12. The method according to claim 7, wherein the corridor displays information of the unmanned vehicle occupied according to a time sequence at each point in a space occupied by the flight path, and displays the information of the unmanned vehicle in an order of occupying corresponding points.

13. The method according to claim 1, wherein said defining the cloud-based 3-dimensional airspace space includes:

collecting 2-dimensional location information on a path generating area in which the flight path of the unmanned vehicle is generated;

determining a range of the path generating area based on the collected 2-dimensional location information;

defining the cloud-based 3-dimensional airspace space by generating a point cloud airspace space composed of the space vector points based on the determined range of the path generating area;

changing an airspace space of the point cloud according to a surrounding environment of the cloud-based 3-dimensional airspace space or a user request; and rendering the cloud-based 3-dimensional airspace space.

14. The method according to claim 13, wherein in the point cloud airspace space, one or more of the point size, an x-axis, y-axis, and z-axis spacing between points, a weight for the point spacing, and a position in the airspace space are defined.

15. The method according to claim 14, wherein said changing the point cloud airspace space changes at least one or more parameter values among the point size, the x-axis, y-axis, and z-axis spacing between points, the weight for the point spacing, and the position in the airspace space.

16. The method according to claim 1, wherein said selecting the corridor constitution type and the obstacle detection avoidance type includes:

selecting any one of constitution types of a user click type and an automated type to constitute the corridor for the flight path of the unmanned vehicle; and selecting the obstacle detection and avoidance type for any one of a corridor type and a curve type to configure an avoidance path when detecting obstacles in a traveling direction of the flight path.

17. The method according to claim 16, wherein said selecting the obstacle detection avoidance type includes: if the corridor type is selected, when detecting the obstacle in the traveling direction of the flight path, configuring the flight path by avoiding the obstacle to other space vector points in a vicinity; and if the curve type is selected, when detecting the obstacle in the traveling direction of the flight path, configuring the flight path by avoiding the obstacle to an interpolated point using the Bezier curve interpolation.

18. The method according to claim 1, wherein said generating and displaying the flight path of the unmanned vehicle further includes:

when the starting point of the flight path configured in said constituting the corridor is changed, reconstituting the corridor based on the changed starting point.

19. The method according to claim 1, further comprising:

verifying the flight path corresponding to the constituted n corridors and simulating the flight path according to a speed and time of the unmanned vehicle; and outputting entire corridors based on verification and simulation results for the n corridors, and storing the outputted information of the entire corridors in a database corresponding to path IDs, wherein said simulating the flight path includes:

displaying a virtual path image and a virtual unmanned vehicle image for each path of the n corridors, and changing and displaying a location of the virtual unmanned vehicle image based on a flight plan depending on the speed and time of the unmanned vehicle set for each path.

* * * * *